United States Patent
Szilágyi

(10) Patent No.: US 10,973,065 B2
(45) Date of Patent: Apr. 6, 2021

(54) COMMUNICATING VEHICULAR COMMUNICATION MESSAGES

(71) Applicant: NOKIA SOLUTIONS AND NETWORKS OY, Espoo (FI)

(72) Inventor: Péter Szilágyi, Budapest (HU)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 16/992,398

(22) Filed: Aug. 13, 2020

(65) Prior Publication Data
US 2021/0058992 A1 Feb. 25, 2021

(30) Foreign Application Priority Data
Aug. 23, 2019 (FI) .................................. 20195699

(51) Int. Cl.
| | |
|---|---|
| H04W 76/14 | (2018.01) |
| H04W 4/06 | (2009.01) |
| H04W 72/04 | (2009.01) |
| H04W 4/40 | (2018.01) |

(52) U.S. Cl.
CPC ............. *H04W 76/14* (2018.02); *H04W 4/06* (2013.01); *H04W 4/40* (2018.02); *H04W 72/0493* (2013.01)

(58) Field of Classification Search
CPC .......... H04W 76/14; H04W 4/06; H04W 4/40
See application file for complete search history.

(56) References Cited

U.S. PATENT DOCUMENTS

| | | | |
|---|---|---|---|
| 2008/0095163 A1 | 4/2008 | Chen et al. | |
| 2018/0242127 A1 | 8/2018 | Kwoczek | |
| 2019/0037448 A1* | 1/2019 | Shan | H04W 4/48 |

(Continued)

FOREIGN PATENT DOCUMENTS

| | | |
|---|---|---|
| JP | 2012-165387 A | 8/2012 |
| JP | 2019-522430 A | 8/2019 |
| KR | 10-2018-0044368 A | 5/2018 |

(Continued)

OTHER PUBLICATIONS

Office Action dated Dec. 4, 2019 corresponding to Finnish Patent Application No. 20195699.

(Continued)

*Primary Examiner* — Kodzovi Acolatse
*Assistant Examiner* — Farhad Ali
(74) *Attorney, Agent, or Firm* — Squire Patton Boggs (US) LLP

(57) ABSTRACT

There is provided a solution for handling vehicle-to-everything messages in an access node of a cellular communication system. According to an aspect, a method comprises: processing, by the access node, cellular access messages according to a cellular communication protocol stack and delivering, by the access node, the cellular access messages between a terminal device and a core network of the cellular communication system; and processing, by the access node, vehicle-to-everything messages according to a sidelink communication protocol stack of vehicle-to-everything communications and delivering, by the access node, the vehicle-to-everything messages between at least one vehicular terminal device and an application server.

12 Claims, 7 Drawing Sheets

(56) References Cited

U.S. PATENT DOCUMENTS

2019/0045034 A1    2/2019   Alam
2019/0174344 A1    6/2019   Karella et al.

FOREIGN PATENT DOCUMENTS

| WO | WO-2017189035 A1 * | 11/2017 | ............ H04W 88/06 |
| WO | 2018/013786 A2 | 1/2018 | |
| WO | WO 2018/125686 A2 | 7/2018 | |
| WO | WO 2019/010049 A1 | 1/2019 | |
| WO | 2019/092944 A1 | 5/2019 | |
| WO | WO 2019/133048 A1 | 7/2019 | |

OTHER PUBLICATIONS

Finnish Search Report dated Dec. 4, 2019 corresponding to Finnish Patent Application No. 20195699.

Communication of Acceptance under section 29a of Patents Decree dated Apr. 16, 2020 corresponding to Finnish Patent Application No. 20195699.

3GPP TR 38.885 V16.0.0 (Mar. 2019), Technical Report, 3rd Generation Partnership Project; Technical Specification Group Radio Access Network; NR; Study on NR Vehicle-to-Everything (V2X) (Release 16), Mar. 28, 2019, pp. 1-22.

Extended European Search Report issued in corresponding European Patent Application No. 20186117.6, dated Oct. 29, 2020.

Notice of Preliminary Rejection dated Sep. 28, 2020 corresponding to Korean Patent Application No. 2020-0105317, with concise statement of relevance.

Notice of Reasons for Rejection issued in corresponding Japanese Patent Application No. 2020-139246 dated Feb. 8, 2021, with English summary thereof.

Catt, "Discussion on PC5/Uu transport for V2I/N services," 3GPP TSG RAN WG3 Meeting #90 R3-152471, Nov. 16, 2015, <URL:http://www.3gpp.org/ftp/tsg_ran/WG3_lu/TSGR3_90/Docs/R3-152471.zip>.

* cited by examiner

US 10,973,065 B2

COMMUNICATING VEHICULAR COMMUNICATION MESSAGES

TECHNICAL FIELD

The invention relates to a mobile communication network provided with capability of processing vehicular communication messages.

BACKGROUND

Vehicular communication systems refer to networks in which vehicles and road-side units (RSU) represent the communicating nodes, providing each other with information on safety warnings and traffic congestion, for example. Deploying local warning systems through vehicular communications enables eliminating the excessive cost of traffic collisions. Vehicle-to-vehicle (V2V) technology refers to an automobile technology that allows vehicles to communicate with each other. V2V may also be referred to as a vehicular ad hoc network (VANET). The vehicular ad hoc networks may be formed by cars, and used for a variety of applications including safety, navigation, and law enforcement.

Vehicle-to-everything (V2X) communication is a generalization of V2V. V2X covers other forms of vehicular communication, e.g. vehicle-to-network (V2N), vehicle-to-pedestrian (V2 P), vehicle-to-infrastructure (V2I), and vehicle-to-device (V2D).

US 2019/037448 discloses embodiments of Vehicle-to-everything (V2X) communications authentication. In some embodiments, a user equipment (UE) configured V2X communication and configured to operate within a fifth-generation system (5GS) and/or a combined 5GS and fourth-generation system (4GS) can encode a V2X capability indication in a request message for transmission to a network entity, such as a Access and Mobility Management Function (AMF). The V2X capability indication can indicate a capability of the UE for V2X communication over a PC5 reference point, and the request message can further include an indication of a Radio Access Technology (RAT). In some embodiments, the AMF can determine whether the UE is authorized to use the V2X communications over the PC5 reference point, and whether the UE is authorized to use the RAT indicated in the request message. Accordingly, the AMF can transmit a V2X services authorization to a next generation radio access network (NG-RAN).

WO 2018/125686 discloses a communication device that can include a processor configured to receive, on a radio channel, an uplink radio transmission in a first waveform format from a terminal device that instructs the communication device to forward the uplink radio transmission to a network access node, and transmit, on the radio channel, the uplink radio transmission to the network access node with a preamble in a second waveform format to protect the uplink radio transmission from collisions.

BRIEF DESCRIPTION

According to an aspect, there is provided the subject matter of the independent claims. Some embodiments are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: processing cellular access messages in an access node of a cellular communication system according to a cellular communication protocol stack and delivering the cellular access messages between a terminal device and a core network of the cellular communication system; and processing vehicle-to-everything messages in the access node according to a sidelink communication protocol stack of vehicle-to-everything communications and delivering the vehicle-to-everything messages between at least one vehicular terminal device and an application server.

In an embodiment, both said cellular communication protocol stack and said sidelink communication protocol stack define a radio interface, and wherein the radio interface defined by the cellular communication protocol stack is different from the radio interface defined by the sidelink communication protocol stack.

In an embodiment, the sidelink communication protocol stack is a first sidelink communication protocol stack, and wherein the means are further configured to process further vehicle-to-everything messages in the access node according to a second sidelink communication protocol stack and to deliver the further vehicle-to-everything messages between said at least one vehicular terminal device and the application server.

In an embodiment, the sidelink communication protocol stack is according to IEEE 802.11p specifications or PC5 of 3GPP specifications.

In an embodiment, the means are configured to operate as an end-device for all sidelink communications with the at least vehicular terminal device below an application layer.

In an embodiment, the means are configured to receive a vehicle-to-everything message via a physical layer of the sidelink communication protocol stack, to extract all headers of the sidelink communication protocol stack from the received vehicle-to-everything message, thus extracting a payload of the received vehicle-to-everything message, to add a new header to the payload, and to transmit the payload with the new header to the application server.

In an embodiment, the apparatus is for a distributed unit of a gNB of 3GPP specifications.

In an embodiment, the means are configured to operate a subset of protocol layers of the sidelink communication protocol stack.

In an embodiment, the apparatus is for a distributed unit of a gNB of 3GPP specifications, and wherein the subset of protocol layers of the sidelink communication protocol stack comprises a number of lowest protocol layers of the sidelink communication protocol stack, and wherein the means are configured to communicate the vehicle-to-everything messages with a central unit of the gNB that operates at least the highest protocol layer of the sidelink communication protocol stack.

In an embodiment, the means are configured to receive a vehicle-to-everything message via a physical layer of the sidelink communication protocol stack, to extract headers from the received vehicle-to-everything message up to the highest protocol layer of the subset of protocol layers of the sidelink communication protocol stack, thus extracting a payload of the received vehicle-to-everything message, and to transmit the payload to a central unit of the gNB through an interface between the distributed unit and the central unit.

In an embodiment, the apparatus is for a central unit of a gNB of 3GPP specifications, and wherein the subset of protocol layers of the sidelink communication protocol stack comprises a number of highest protocol layers of the sidelink communication protocol stack, and wherein the means are configured to communicate the vehicle-to-everything messages with a distributed unit of the gNB that operates at least the lowest protocol layer of the sidelink communication protocol stack.

In an embodiment, the means are configured to receive a payload of a vehicle-to-everything message from a distributed unit of the gNB on the lowest layer of the sidelink communication protocol stack supported by the central unit, to extract remaining headers from the received vehicle-to-everything message up to the highest protocol layer of the subset of protocol layers of the sidelink communication protocol stack, thus extracting a payload of the received vehicle-to-everything message, to add a new header to the payload, and to transmit the payload with the new header to the application server.

In an embodiment, the means comprises at least one processor and at least one memory including a computer program code, wherein the at least one memory and the computer program code are configured, with the at least one processor, to cause the performance of the apparatus.

According to an aspect, there is provided a method comprising: processing, by an access node of a cellular communication system, cellular access messages according to a cellular communication protocol stack and delivering, by the access node, the cellular access messages between a terminal device and a core network of the cellular communication system; and processing, by the access node, vehicle-to-everything messages according to a sidelink communication protocol stack of vehicle-to-everything communications and delivering, by the access node, the vehicle-to-everything messages between at least one vehicular terminal device and an application server.

In an embodiment, both said cellular communication protocol stack and said sidelink communication protocol stack define a radio interface, and wherein the radio interface defined by the cellular communication protocol stack is different from the radio interface defined by the sidelink communication protocol stack.

In an embodiment, the sidelink communication protocol stack is a first sidelink communication protocol stack, and wherein the access node processes further vehicle-to-everything messages according to a second sidelink communication protocol stack and delivers the further vehicle-to-everything messages between said at least one vehicular terminal device and the application server.

In an embodiment, the sidelink communication protocol stack is according to IEEE 802.11p specifications or PC5 of 3GPP specifications.

In an embodiment, the access node operates as an end-device for all sidelink communications with the at least vehicular terminal device below an application layer.

In an embodiment, the access node receives a vehicle-to-everything message via a physical layer of the sidelink communication protocol stack, extracts all headers of the sidelink communication protocol stack from the received vehicle-to-everything message, thus extracting a payload of the received vehicle-to-everything message, adds a new header to the payload, and transmits the payload with the new header to the application server.

In an embodiment, the apparatus is for a distributed unit of a gNB of 3GPP specifications.

In an embodiment, the access node operates a subset of protocol layers of the sidelink communication protocol stack.

In an embodiment, the access node is a distributed unit of a gNB of 3GPP specifications, and the subset of protocol layers of the sidelink communication protocol stack comprises a number of lowest protocol layers of the sidelink communication protocol stack, and wherein the access node communicates the vehicle-to-everything messages with a central unit of the gNB that operates at least the highest protocol layer of the sidelink communication protocol stack.

In an embodiment, the access node receives a vehicle-to-everything message via a physical layer of the sidelink communication protocol stack, extracts headers from the received vehicle-to-everything message up to the highest protocol layer of the subset of protocol layers of the sidelink communication protocol stack, thus extracting a payload of the received vehicle-to-everything message, and transmits the payload to a central unit of the gNB through an interface between the distributed unit and the central unit.

In an embodiment, the access node is a central unit of a gNB of 3GPP specifications, and wherein the subset of protocol layers of the sidelink communication protocol stack comprises a number of highest protocol layers of the sidelink communication protocol stack, and wherein the access node communicates the vehicle-to-everything messages with a distributed unit of the gNB that operates at least the lowest protocol layer of the sidelink communication protocol stack.

In an embodiment, the access node receives a payload of a vehicle-to-everything message from a distributed unit of the gNB on the lowest layer of the sidelink communication protocol stack supported by the central unit, extracts remaining headers from the received vehicle-to-everything message up to the highest protocol layer of the subset of protocol layers of the sidelink communication protocol stack, thus extracting a payload of the received vehicle-to-everything message, adds a new header to the payload, and transmits the payload with the new header to the application server.

According to an aspect, there is provided a computer-program product comprising a computer program code embodied on a distribution medium readable by a computer, wherein the computer program code configures the computer, when executed by the computer, to carry out a computer process comprising: processing, in an access node of a cellular communication system, cellular access messages according to a cellular communication protocol stack and delivering the cellular access messages between a terminal device and a core network of the cellular communication system; and processing, in the access node, vehicle-to-everything messages according to a sidelink communication protocol stack of vehicle-to-everything communications and delivering the vehicle-to-everything messages between at least one vehicular terminal device and an application server.

BRIEF DESCRIPTION OF DRAWINGS

In the following some embodiments will be described with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR) (or can be referred to as 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
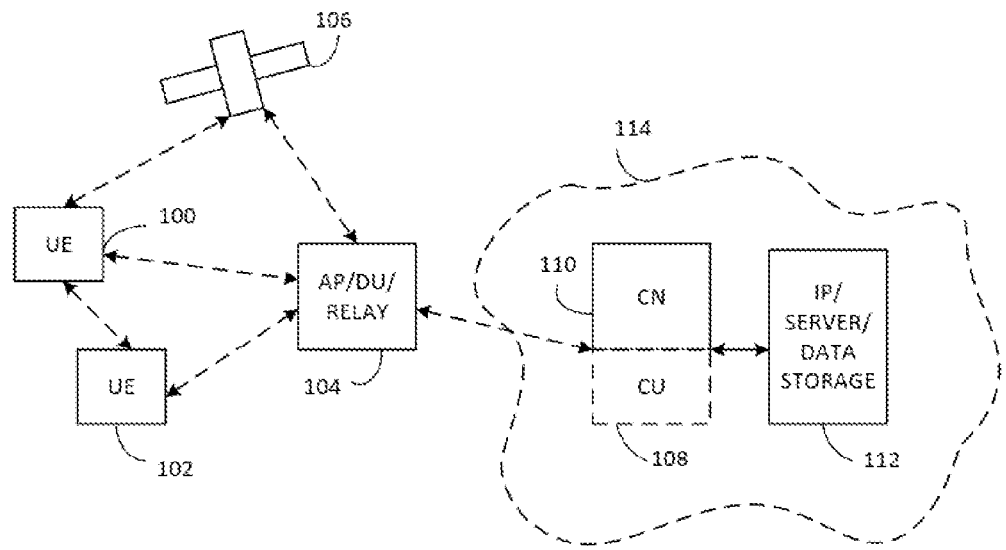
FIG. 1 illustrates an example of a wireless network to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node 104 (such as (e/g) NodeB) providing the cell. The physical link from a user device to a (e/g)NodeB is called uplink (UL) or reverse link and the physical link from the (e/g)NodeB to the user device is called downlink or forward link. It should be appreciated that (e/g)NodeBs or their functionalities may be implemented by using any node, host, server or access point etc. entity suitable for such a usage. Said node 104 may be referred to as network node 104 or network element 104 in a broader sense.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a user plane function (UPF) (this may be 5G gateway corresponding to serving gateway (S-GW) of 4G) or access and mobility function (AMF) (this may correspond to mobile management entity (MME) of 4G).

The user device 100, 102 (also called UE, user equipment, user terminal, terminal device, mobile terminal, etc.) illustrates one type of an apparatus to which resources on the air interface are allocated and assigned, and thus any feature described herein with a user device may be implemented with a corresponding apparatus, such as a part of a relay node. An example of such a relay node is an integrated access and backhaul (IAB)-node (a.k.a. self-backhauling relay).

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink-only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments mobile terminal (MT) part of the relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices may have one or more antennas. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being applicable to existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. MEC covers a wide range of technologies such as wireless sensor networks, mobile data acquisition, mobile signature analysis, cooperative distributed peer-to-peer ad hoc networking and processing, autonomous vehicles, traffic safety, real-time analytics, time-critical control, and healthcare applications. A basic concept of the MEC is that application level cloud-computing capabilities, information technology services, etc. are provided at the edge of the mobile communication network. The edge refers to the radio access network and/or other network elements closer to the terminal devices than a core network 110 or the application servers 112 in FIG. 1. The MEC is characterized by ultra-low latency and high bandwidth as well as real-time access to radio network information that can be leveraged by applications. According to the MEC concept, a mobile network operator may open the radio access network edge to authorized third-parties, allowing them to flexibly and rapidly deploy innovative applications and services towards mobile subscribers, enterprises and vertical segments. Applications that may benefit of the MEC include video analytics, location-based services, Internet-of-Things (IoT), augmented reality, local content distribution, data caching, and automotive applications. The MEC allows software applications to access local content and real-time information about local access network conditions. The MEC may also reduce the traffic between the radio access network and the core network by performing the high-level application processing close to the terminal devices.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into a radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side and non-real time functions being carried out in a centralized manner.

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femtoor picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
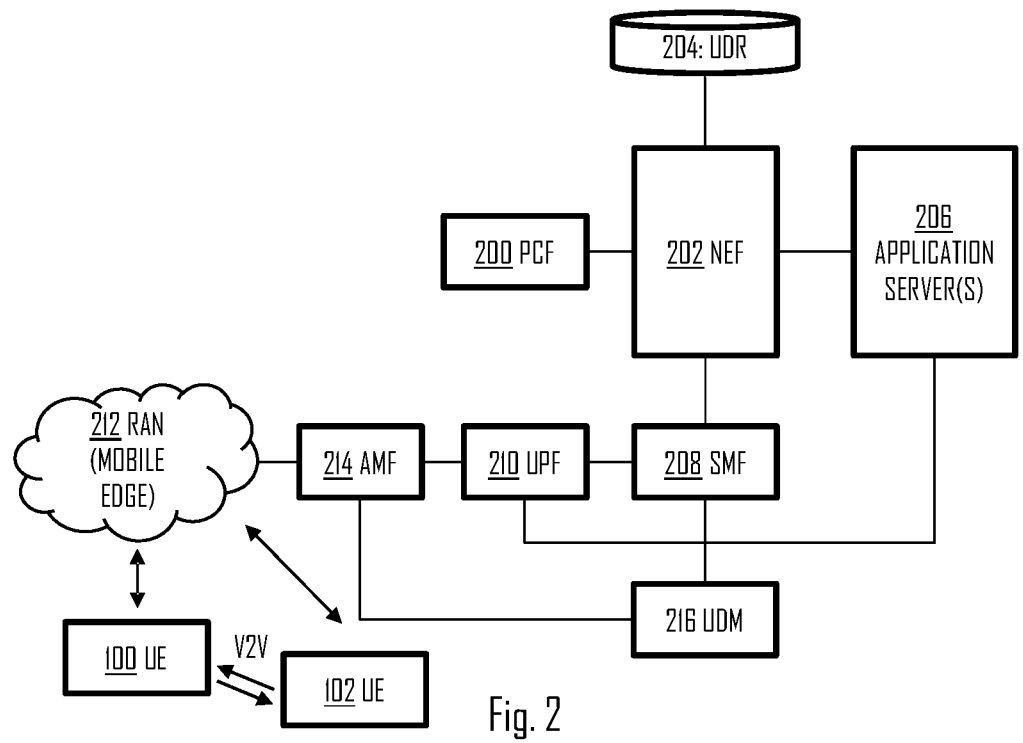
FIG. 2 illustrates elements of a mobile communication network to which embodiments of the invention may be applied.

FIG. 2 illustrates a block diagram of some network elements and their interconnections in a 5G mobile communication network. Referring to FIG. 2, the terminal device 100 (UE) is connected to a radio access network 212 illustrated by the cloud in FIG. 2. The radio access network may comprise or be comprised in the multi-access edge or mobile edge of the mobile communication network that performs the multi-access edge computing. The multi-access edge may comprise one or a plurality of the following network elements: various access nodes of the radio access network 212 including fixed and mobile base stations, radio network controllers of the 5G system for interconnection with other radio access technologies such as WiFi (IEEE 802.11 networks), cable modem termination systems (CMTS), terminals of optical networks, access points for other wireless networks such as Zigbee, WiFi, or MuLTEfire, routers, and switches. Virtually any network element in the radio access network (RAN) or closer to the terminal device than the core network 110 and having application data processing capability may be harnessed for the multi-access edge computing.

The radio access network is connected to a user plane function (UPF) 210 that serves as an anchor point for protocol data unit (PDU) sessions established with the terminal devices. The UPF provides data packet routing and quality-of-service (QoS) management functions, for instance. The UPF is controlled by a session management function (SMF) 208 that provides traffic steering configurations for the UPF 210 for proper traffic routing. The SMF also performs session management including session establishment, modification, and release, UE internet protocol (IP) address allocation & management and other Dynamic Host Configuration Protocol (DHCP) functions, terminate non-access stratum (NAS) signaling that is related to session management, etc.

An access and mobility management function (AMF) 214 may manage mobility of terminal devices. The network may comprise many AMF instances. The AMF may terminate a RAN control plane and implement ciphering and integrity protection algorithms. From a perspective, the AMF carries out some tasks similar to those of a mobility management entity (MME) of an LTE system.

A policy control function (PCF) 200 is responsible for a unified policy framework that governs behavior of the mobile communication network. The PCF provides policy rules to user plane and control plane functions. The PCF may access a unified data repository 204 (UDR) when creating or modifying policies. The UDR 204 stores, for example subscriber information related to the terminal devices, and it may define some preferences of the subscription that may affect the policies decided by the PCF. A network exposure function (NEF) 202 provides an adaptation or exposure function that enables secure exposure of services and features between the 5G core network elements (e.g. the PCF and UPF) and application server(s) 206. The NEF 202 may mediate information on capabilities and events between the core network elements and the application servers, provide a translation function for the information in a form of an application programming interface (API). The NEF 202 may be described as service-aware border gateway that enables application servers or functions external to the 5G core network to communicate with the network elements of the core network.

A user plane connection may also be provided between the UPF 210 and the application server(s) 206 for the purpose of transferring application data.

A unified data management (UDM) function performs tasks similar to a home subscriber server (HSS) function of the LTE networks. Such procedures include generation of authentication and key agreement (AKA) credentials, UE or user identification, access authorization, and subscription management.

In V2V communications, vehicular terminal devices transmit messages directly to one another. FIG. 2 illustrates a V2V link between the UEs 100, 102. Additionally, the vehicular UEs 100, 102 may connect to the RAN 212 over cellular connections, e.g. a LTE or 5G radio resource control (RRC) connection. The cellular connection may be established over a radio interface which, in the LTE and 5G systems is called a Uu interface. The V2V link may support a communication protocol different from a communication protocol of cellular connections. Examples of the V2V communication protocols include Institute of Electrical and Electronics Engineers (IEEE) 802.11p protocol and a PC5 protocol. PC5 is developed with in the $3^{rd}$ Generation Partnership Project (3GPP). The 802.11p is in some literature called direct or dedicated short-range communication (DSRC). Because of the different protocols, a conventional access node of a cellular communication system cannot receive or detect the V2V messages exchanged between the vehicular UEs 100, 102. Similar characteristics may apply to some other V2X communications, e.g. V2P. It might, however, be beneficial to acquire information contained in such V2X messages in the cellular network. The V2X messages may carry information on traffic, accidents, alerts, etc. that could be used for configuring the cellular communication system. Equally, it might be beneficial to communicate messages from the application server to the vehicular terminal devices.

Figure 3:
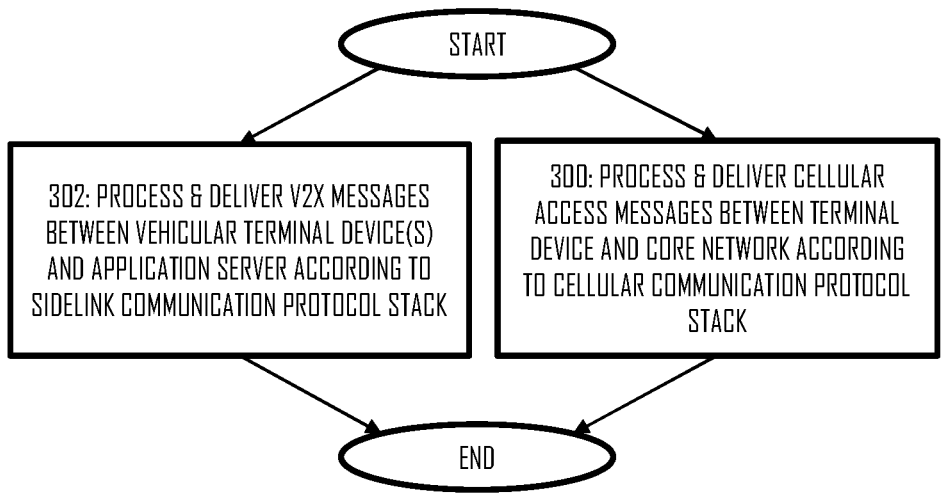
FIG. 3 illustrates an embodiment for communicating vehicular broadcast messages.

FIG. 3 illustrates an embodiment for an access node of the cellular communication system to communicate the V2X messages between the vehicular terminal device(s) 100, 102 and the application server(s) 206, besides its primary function of providing terminal devices with cellular access to other networks. The application server(s) may comprise one or more MEC servers. FIG. 3 illustrates a procedure for the access node, comprising: processing (block 300) cellular access messages in an access node of a cellular communication system according to a cellular communication protocol stack and delivering the cellular access messages between a terminal device and a core network of the cellular communication system; and processing (block 302) vehicle-to-everything messages in the access node according to a sidelink communication protocol stack of vehicle-to-everything communications and delivering the vehicle-to-everything messages between at least one vehicular terminal device and an application server.

The embodiments described above configure the access node(s) to capture the vehicular broadcast messages. By implementing the capability in the access nodes, design and installation of separate, dedicated capturing devices can be avoided or reduced, thus reducing operational expenses and complexity of the system.

The protocol used for transmitting and receiving the broadcast V2X messages may be designed for UEs, i.e. both the transmitter and the receiver of the V2X messages is designed to be the UE. Therefore, the conventional access node not supporting the UE protocol cannot detect the V2X messages. In an embodiment, the access node is configured to establish a virtual terminal device supporting the required protocol and to capture the broadcast message by using the virtual terminal device. The virtual terminal device may support one or more communication protocols of vehicular UEs.

In an embodiment, the virtual terminal device is configured to process different protocol messages than cellular connection management features of the access node. In other words, the access node may support at least two different protocol stacks: one for the virtual UE and one for the conventional access node features.

In an embodiment, the application server is a server of mobile edge computing. The application server may reside in a core network of the cellular communication system, or in a network beyond the core network from the perspective of the access node. The application server may be a physical server or a virtual server, or a cloud server.

As illustrated in FIG. 3, the access node may execute the blocks 300, 302 in parallel processes. In other words the blocks 300, 302 may be carried out concurrently and independently of one another.

Figure 4:
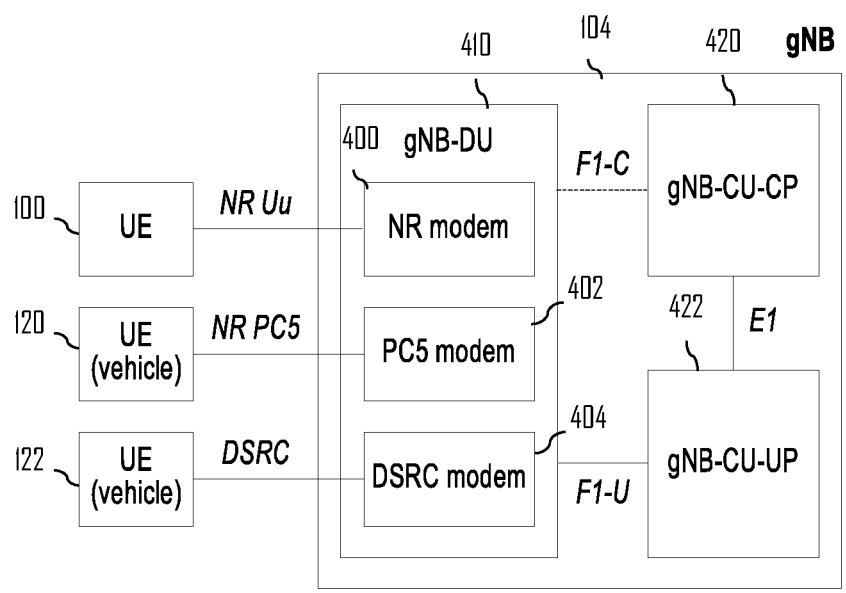
FIG. 4 illustrates a block diagram of an access node according to an embodiment of the invention.

FIG. 4 illustrates a block diagram of a 5G access node (gNB) 104 operating according to an embodiment of the process of FIG. 3. As defined in the 3GPP specifications, the access node the gNB may include a central unit (CU) and a distributed unit (DU), and functions of the gNB are split between the CU and the DU 410. The CP is further split into a control plane CU (CU-CP) 420 and a user plane CU (CU-UP) 422. An interface between the CU-CP and CU-UP is E1 interface, while the DU connects to the CU via F1-C (control plane) and F1-U (user plane) interfaces, as illustrated in FIG. 4. The CU-CP may manage radio resource control and higher protocol layers of cellular connections, such as a packet data convergence protocol (PDCP) layer and/or a service data adaptation protocol (SDAP) layer while the DU manages lower protocol layers such as a radio link control (RLC) layer, medium access control (MAC) layer, and physical layer. The functional split is, however, flexible and different splits have been envisaged. Each split has its advantages and disadvantages.

Further referring to FIG. 4, the gNB DU may comprise the 5G radio modem (new radio, NR) 400 for the cellular access provided by the gNB for the terminal devices. Furthermore, the gNB may comprise at least one radio modem 402, 404 for sidelink communications. The at least one radio modem 402, 404 for sidelink communications may implement at least some of the sidelink communication protocol stack. FIG. 4 illustrates an embodiment where the DU 410 includes the NR modem 410 and the sidelink radio modems 402, 404. In another embodiment, the gNB includes a dedicated DU for each radio modem. In other words, a separate DU may be provided for the NR modem 400 and the sidelink modem 402 or 404. Accordingly, such an embodiment would be a modification of FIG. 4 in the sense that a separate DU would be provided for each radio modem 400 to 404. Each DU would naturally have connections to the CU-UP 420 and CU-CP 422. The sidelink communication protocol stack may be according to IEEE 802.11p specifications or PC5 of 3GPP specifications. According to the embodiment of FIG. 4, the gNB is thus provided with capability of providing the cellular access for conventional terminal devices (UE 100) and, additionally, capability of communicating V2X payload with vehicular UEs 120, 122 via one or more sidelink communication protocol stacks.

With respect to the definition of the sidelink, the term is analogous to what is meant with the term in the literature. A sidelink is an adaptation of a wireless standard that allows direct communication between terminal devices without going through an access node. The sidelink typically differs from the base standard at least on the physical layer. For example, 802.11p is based on 802.11 specifications but has some unique properties on the physical layer. In the same manner, PC5 is based on 3GPP specifications (LTE and 5G) but has some unique characteristics related to the difference between direct device-to-device communications and device-to-e/gNB communications. The sidelink is commonly associated with V2V and generally V2X communications in the literature.

In an embodiment, both said cellular communication protocol stack and said sidelink communication protocol stack define a radio interface, including a physical layer, and wherein the radio interface defined by the cellular communication protocol stack is different from the radio interface defined by the sidelink communication protocol stack.

Figure 5A:
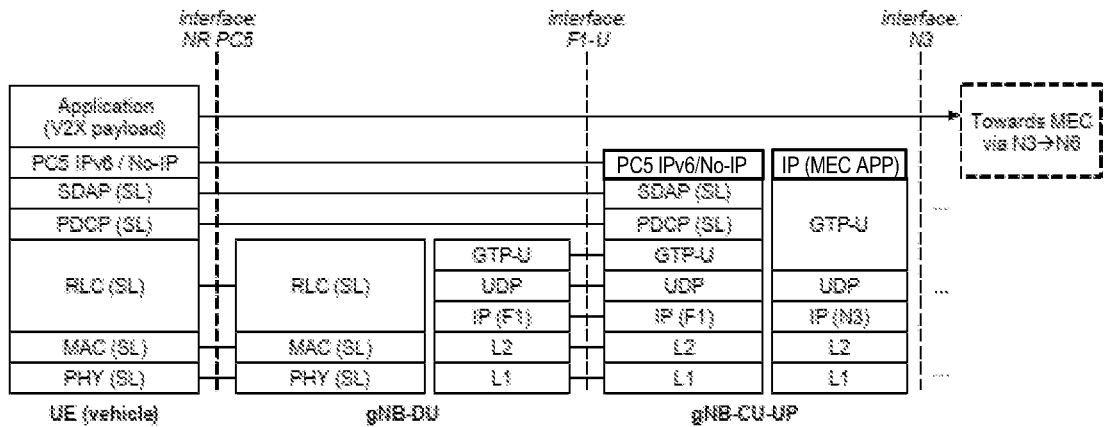
FIGS. 5A and 5B illustrate protocol stacks for an access node employing a functional split according to some embodiments.
Figure 5B:
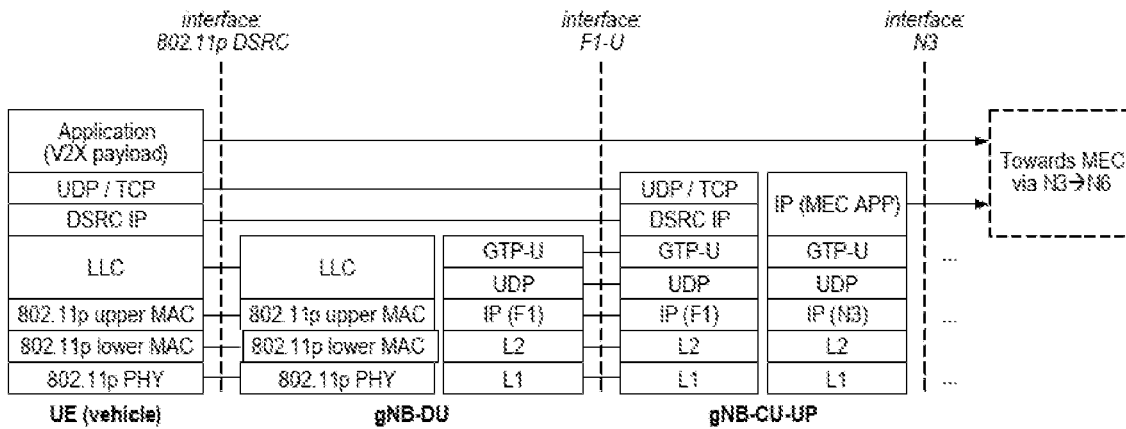
Figure 6A:
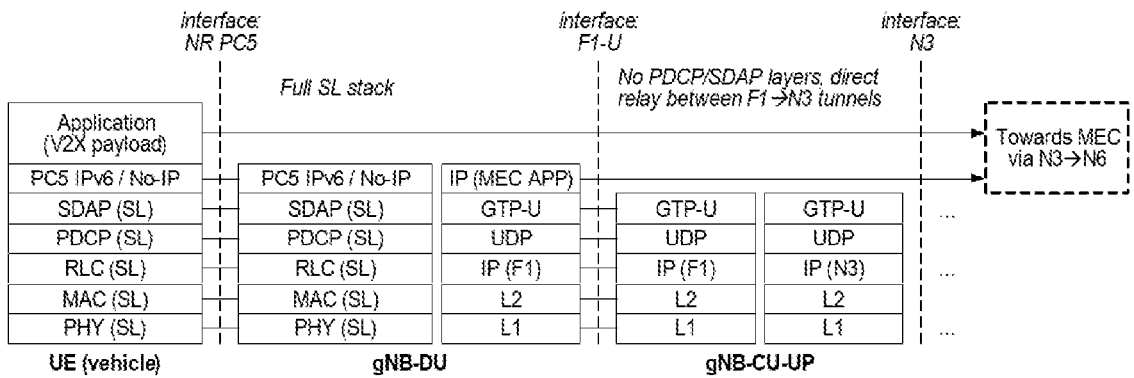
FIGS. 6A and 6B illustrate protocol stacks for an access node employing a functional split according to other embodiments.
Figure 6B:
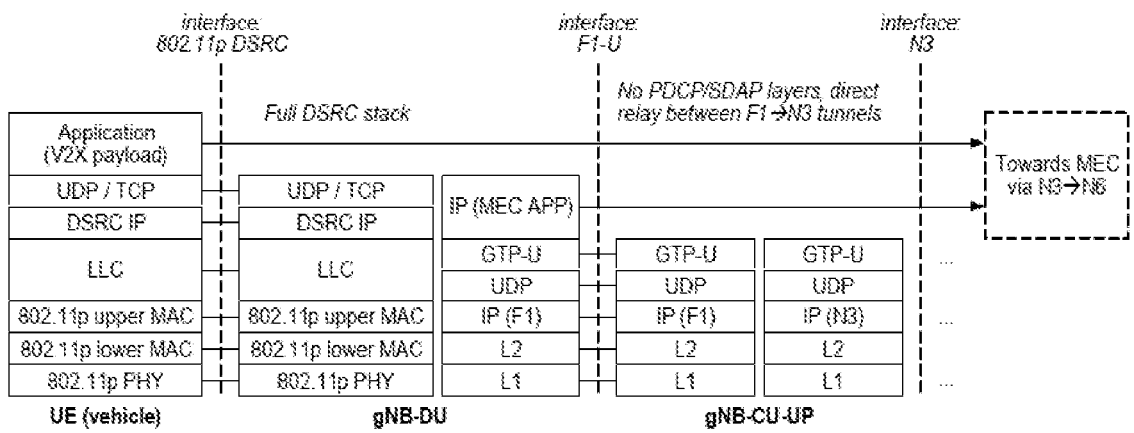

FIGS. 5A to 6B illustrate protocol stacks according to some embodiments. FIGS. 5A and 6A illustrate protocol stacks for the access node supporting the PC5 as a sidelink while FIGS. 6A and 6B illustrate protocols stack for the access node supporting the IEEE 802.11p.

As illustrated in FIGS. 5 to 6B, the access node may employ a first protocol stack for communicating with the vehicular terminal device(s) and a second protocol stack for communicating towards the core network and the application server. The first protocol stack may be the sidelink communication protocol stack described above. Let us next describe the protocol stacks in greater detail.

As illustrated in FIGS. 5A to 6B, a vehicular UE supports a protocol stack of the PC5 protocol (FIGS. 5A & 6A) or an IEEE 802.11p protocol (FIGS. 5B & 6B). An application layer generates or processes V2X payload data transmitted/received through lower protocol layers used for delivering the V2X payload. Referring to FIGS. 5A and 6A, the lower protocol layers may include a PC5 internet protocol (IP) version 6 layer which is an optional layer. In 5G, there is further a service data adaptation protocol (SDAP) layer that performs mapping between a quality-of-service (QoS) flow and a data radio bearer. Below the SDAP, there are packet data convergence protocol (PDCP) layer performing tasks such as reordering and duplicate detection of data packets, ciphering, etc. Below the PDCP, a radio link control (RLC) layer manages tasks such as (re)segmentation of packets, error correction, etc. Below the RLC, a medium access control (MAC) layer performs tasks such as (de)multiplexing of data packets, error correction, padding, etc. Below the MAC, a physical layer performs modulation and transmission/reception of radio signals carrying the payload data. The access node or DU may include at least some of the same protocol layers as the real vehicular UE except for the application layer. The application layer may be provided in the application server to which the access node forwards the captured messages.

With respect to the second protocol stack for communicating with the application server, the access node may further include a protocol stack for delivering contents of the captured messages to the application server. The messages may be delivered via a UPF (5G) or a packet data network gateway (P-GW in the LTE). The UPF/P-GW may support certain protocol layers and, for the purpose of communicating with the UPF/P-GW, the access node may support the same protocol layers. The layers may include L1 (physical) and L2 (MAC) layers, an IP layer, a user datagram protocol (UDP) layer, and a general packet radio service tunneling protocol for user data (GTP-U). The UPF/P-GW may have another session established with the application server and a link between the two sessions so that the UPF/P-GW is capable of forwarding the messages to the application server (L1 and L2 between the application server and the UPF/P-GW). The application server may support an IP layer of a MEC application, and the access node may have the same layer (IP MEC APP). On top of the MEC IP layer, the application layer of the application server may then process the received payload of the captured messages.

Referring to FIG. 6, the protocol stacks supporting the IEEE 802.11p are similar, the only changes being in the layers of the in the interface between the vehicular UE and the access node. The 802.11p builds on the radio interface of Wi-Fi networks and the physical and MAC layers have corresponding features. On top of the MAC layer, a logical link control (LLC) layer may be provided. The LLC may be a software module that unifies data interfacing to higher layers and may perform at least some functions similar to those performed by the RLC. On top of the LLC, UDP/TCP (transport control protocol)/IP layers may be provided.

As described above, the functions of the access node may be split between the CU and the DU. FIGS. 5A to 6B illustrate some embodiments for implementing the split for the two sidelink protocols. FIGS. 5A & 5B illustrate embodiments where the DU operates one subset of protocol layers of the sidelink communication protocol stack while the CU, e.g. the CU-UP, operates another subset of the protocol layers of the sidelink communication protocol stack. FIGS. 6A & 6B illustrate embodiments where the DU operates as an end-device for all sidelink communications with the at least vehicular terminal device below an application layer. In the embodiment of FIGS. 5A and 5B, a determined number of lowest protocol layers of the sidelink communication protocol stack are operated by the DU. It is natural that at least the physical layer is operated by the DU that includes at least some of radio frequency components needed for implementing the physical layer. Additionally, the DU may implement the MAC layer (upper and lower MAC layers in the 802.11p). In the illustrated embodiments, the DU further operates the layer directly above the MAC layer(s), e.g. the RLC (FIG. 5A) and LLC (FIG. 5B) layers. Upon processing the highest protocol layer of the sidelink supported by the DU, the DU may encapsulate thus extracted V2X payload into a message suitable for delivery to the CU-UP, e.g. into a GTP-U packet. The message is then transmitted to the CU-UP for processing on the higher protocol layers of the sidelink communication protocol stack, e.g. the PDCP and SDAP (FIG. 5A) or DSRC IP and UDP/TCP (FIG. 5B). As a consequence, the CU transfers the V2X payload data from the sidelink communication protocol stack to the second protocol stack for delivering the V2X payload towards the core network and the application server.

In the embodiments of FIGS. 5A and 5B, the CU-UP is configured with the destination address of the application server (on the IP (MEC APP) layer) such that the CU-UP is able to transmit the V2X payload to the appropriate application server.

The embodiments of FIGS. 5A and 5B have the advantage that the DU can be made simpler which reduces cost and complexity of the DU. In deployments where the number of DUs is very high, the embodiment of FIG. 5A or 5B may be advantageous.

As described above, the DU terminates all sidelink communications of the gNB with the vehicular UE in the embodiments of FIGS. 6A and 6B. As a consequence, the DU is the one that transfers the V2X payload data from the sidelink communication protocol stack to the protocol stack delivering the V2X payload towards the core network and the application server. In the embodiments of FIGS. 6A and 6B, the DU is configured with the destination address of the application server (on the IP (MEC APP) layer) such that the DU is able to transmit the V2X payload to the appropriate application server. The CU-UP terminates none of the protocol layers of the sidelink communication protocol stack and, therefore, the CU-UP directly relays the V2X payload received as an IP (MEC APP) packet from the F1-U interface to the N3 interface. The IP datagram carrying the V2X payload is thus transferred towards the application server via the N3 & N6 interfaces of the cellular communication system.

The embodiments of FIGS. 6A and 6B have the advantage that the CU needs no modifications when a new DU with the sidelink capability is installed under the control of the CU. The DU thus provides a stand-alone sidelink capability. As a consequence, installation of new DUs with the sidelink capability can be simplified.

Figure 7:
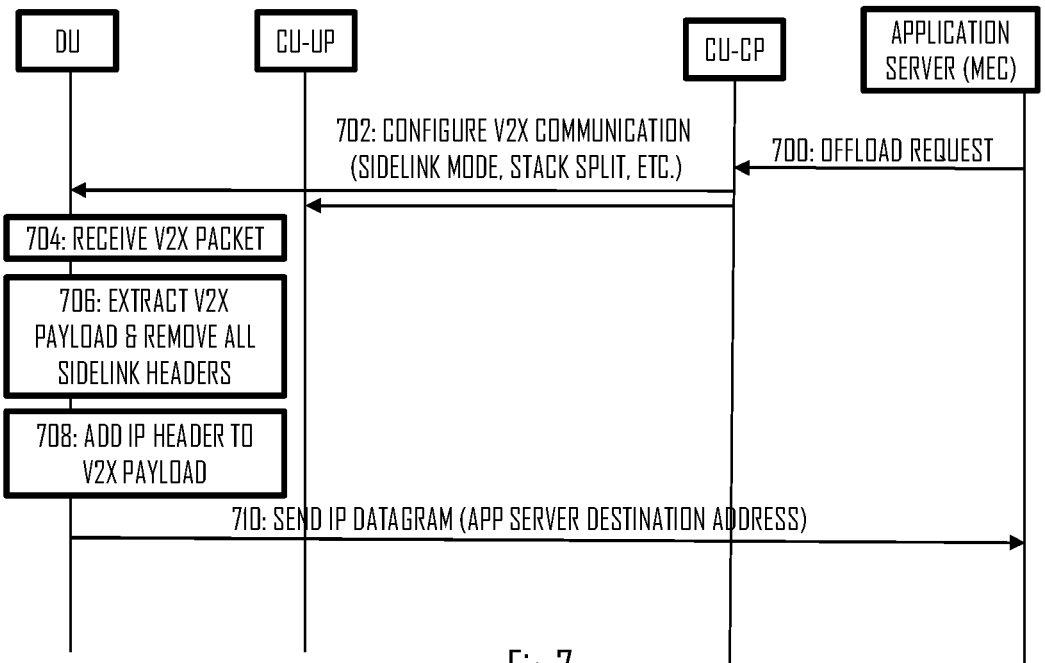
FIG. 7 illustrates a signaling diagram of a setup and operation of V2X communications in an access node according to an embodiment of the invention.

In the embodiments of FIGS. 6A and 6B, the DU is configured to receive a V2X message via a physical layer of the sidelink communication protocol stack, to extract all headers of the sidelink communication protocol stack from the received vehicle-to-everything message, thus extracting a payload of the received vehicle-to-everything message, to add a new header to the payload, and to transmit the payload with the new header to the application server. FIG. 7 illustrates a signaling diagram of such a procedure.

Referring to FIG. 7, the procedure may start with the application server (MEC) sending an offload request message (step 700). The request may be transmitted to the NEF at first. The offload request message may be called an "AF ME V2V Offload Request" message, where AF refers to application function, and ME to mobile edge. This message may contain, at least, the (IP) address of the application server and specifications of a new V2X configuration. The V2X configuration may contain a protocol stack to be used for capturing the messages, e.g. whether PC5 or 802.11p (or any combination of these) is requested to be activated. The message may further contain additional configuration information for the sidelink communications. Further configuration information contained in the request may include definitions of a geographical area from where the application server requests V2X messages to be transferred. The NEF may forward the offload request to one or more AMFs together with at least some of the parameters for configuring the capturing. If the MEC has indicated in the offload request the geographical area from where it requires to communicate the V2X messages, the NEF may use the information on the geographical area to select the AMF(s) that is/are in charge of the area. Upon receiving the forwarded offload request from the NEF, the AMF selects the access node(s) that are in charge of the geographical area (if requested by the application server in the V2X configuration or derived from other policies configured by an operator). The AMF forwards the request to each selected access node and, as a consequence, the CU-CP receives the request (step 700). Accordingly, step 700 may include several functions executed by the various logical entities of the cellular communication system. The CU-CP may then create/initialize the sidelink communication protocol stack(s) in the DU, if it has not yet been created/initialized, and configure the sidelink with the V2X configuration (step 702). Step 702 may comprise at least configuring the destination address of the application server to the DU. In case the access node supports multiple sidelink communication protocols, e.g. both PC5 and 802.11p, the CU-CP may also configured one or more of the supported sidelink communication protocol to be activated.

The CU-CP may configure at least one limitation to V2X messages to be communicated. The limitation(s) may specify what type of V2X messages shall be communicated, e.g. V2V, V2I, or another type of messages. As a consequence, the DU may communicated only messages complying with the at least one limitation and not communicate messages not complying with the at least one limitation. The limitations may specify, for example, a set of vehicular UEs with which the messages shall be communicated, a type of messages to be captured (e.g. messages carrying traffic information or alerts), etc. As a consequence, even though the access node is capable of detecting and transmitting various messages, it may communicate only a subset of the messages, according to the limitations.

In case the DU and the CU-UP support adaptive split of functions for the sidelink communication protocols, the CU-CP may also select and configure one of the supported split of functions. The supported splits may be different for the different sidelink communication protocols. For example, only one of the supported sidelink communication protocols may support the DU terminating all sidelink communications. Accordingly, step 702 may thus include selection of such a sidelink communication protocol stack.

The CU-CP may also establish a new PDU session between the access node and the UPF/P-GW for the transfer of the V2X payload. Upon completing the setup of the virtual UE for capturing the V2V messages, the access node acknowledges that all preparations to start forwarding the V2X payload have been completed. The access node may acknowledge the completion of the setup to the AMF (step 810), and the AMF may forward the message to the NEF (step 812). In the acknowledgement, the AMF may indicate a list of RAN access nodes where the V2V offload service has been activated to the NEF. The NEF forwards the acknowledgment to the application server in step 814.

When the sidelink communication protocol stack has been configured, the DU is ready to receive a V2X message through a physical layer of the sidelink communication protocol stack (block 704). In block 706, the DU extracts the V2X payload from the received V2X message and removes all headers of the sidelink communication protocol. In block 708, the DU encapsulates the V2X payload into an IP datagram and adds an IP header to the IP datagram. The IP address of the application server may be added as a destination address in the IP datagram. Thereafter, the IP datagram is sent from the DU towards the application server. The IP datagram may first be transmitted to the CU-UP over the F1-U interface, and the CU-UP may simply forward the packet to the UPF via the N3 interface and further to the application server through the PDU session established between the access node and the UPF/P-GW.

Figure 8:
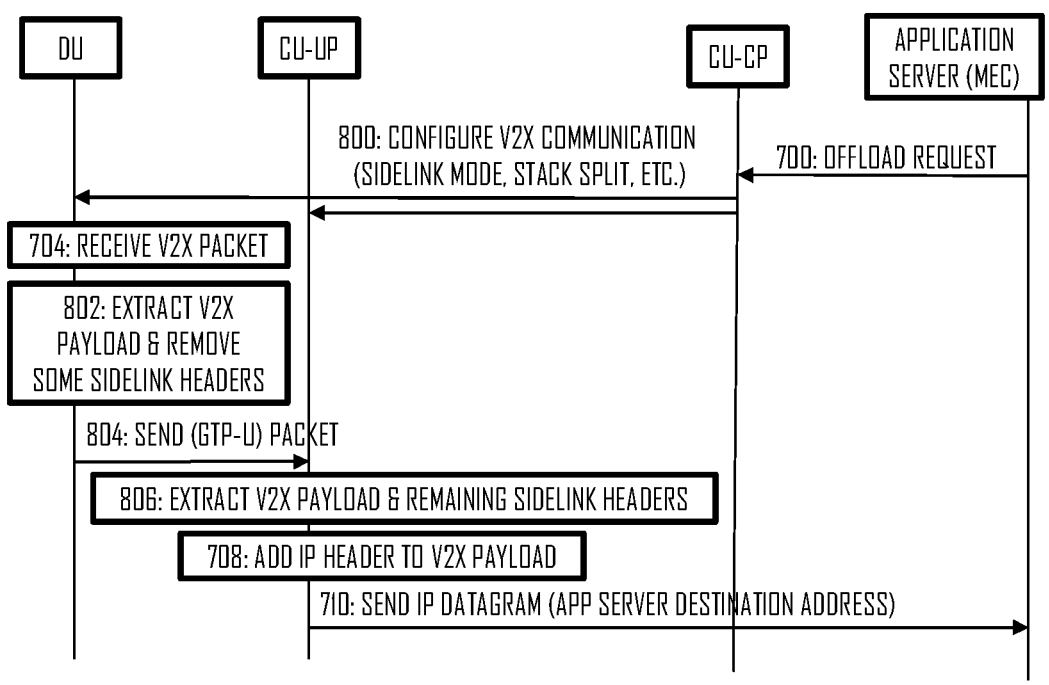
FIG. 8 illustrates a signaling diagram of a setup and operation of V2X communications in an access node according to another embodiment of the invention.

FIG. 8 illustrates a signaling diagram for the embodiments of FIGS. 5A and 5B where the functions of the sidelink communications are split between the DU and the CU-UP. Referring to FIG. 8, the DU operates a number of lowest protocol layers of the sidelink communication protocol stack, and communicates the V2X messages with the CU-UP that operates at least the highest protocol layer of the sidelink communication protocol stack. The CU-UP operates a number of highest protocol layers of the sidelink communication protocol stack, and communicates the V2X messages with the DU that operates at least the lowest protocol layer of the sidelink communication protocol stack.

In FIG. 8, the operations denoted by the same reference number as in FIG. 7 represent the same or substantially similar operations. Accordingly, the setup of the sidelink communications may follow the above-described principles (step 700 and 800). The only difference may be that the CU-CP now configures the split of functions in the different manner (step 800), e.g. configures at least one protocol layer of the sidelink communication protocol stack to each of the DU and CU-UP. As described above, the DU may manage at least the physical layer communications of the sidelink communication protocol stack, and the CU-UP may manage at least the highest protocol layer of the sidelink communication protocol stack. Upon receiving the V2X packet (block 704) through the physical layer, the DU may extract the V2X payload from the received message up to a header of the highest protocol layer supported by the DU (block 802), e.g. the RLC in the embodiment of FIG. 5A or LLC in the embodiment of FIG. 5B. Thereafter, the DU may encapsulated thus extracted V2X payload into a GTP-U message and transmits a GTP-U packet to the CU-UP in step 804. Upon receiving the GTP-U message in step 804, the CU-UPO extracts the v2x payload and the remaining headers of the sidelink communication protocol stack (block 806), adds an IP header to the V2X payload with the destination address of the application server in the header and transmits the IP datagram to the application server (steps 708 and 710).

In other words, the DU receives a V2X message via a physical layer of the sidelink communication protocol stack, extracts headers from the received vehicle-to-everything message up to the highest protocol layer of the subset of protocol layers of the sidelink communication protocol stack supported by the DU, thus extracting a payload of the received vehicle-to-everything message, and transmits the payload to a CU-UP through the F1-U interface. The CU-UP receives the payload and extracts the remaining headers of the sidelink communication protocol stack from the received payload up to the highest protocol layer of the subset of protocol layers of the sidelink communication protocol stack supported by the CU-UP, thus extracting V2X application data as the V2X payload, adds a new (IP) header to the payload, and transmits the payload with the new header to the application server.

Figure 9:
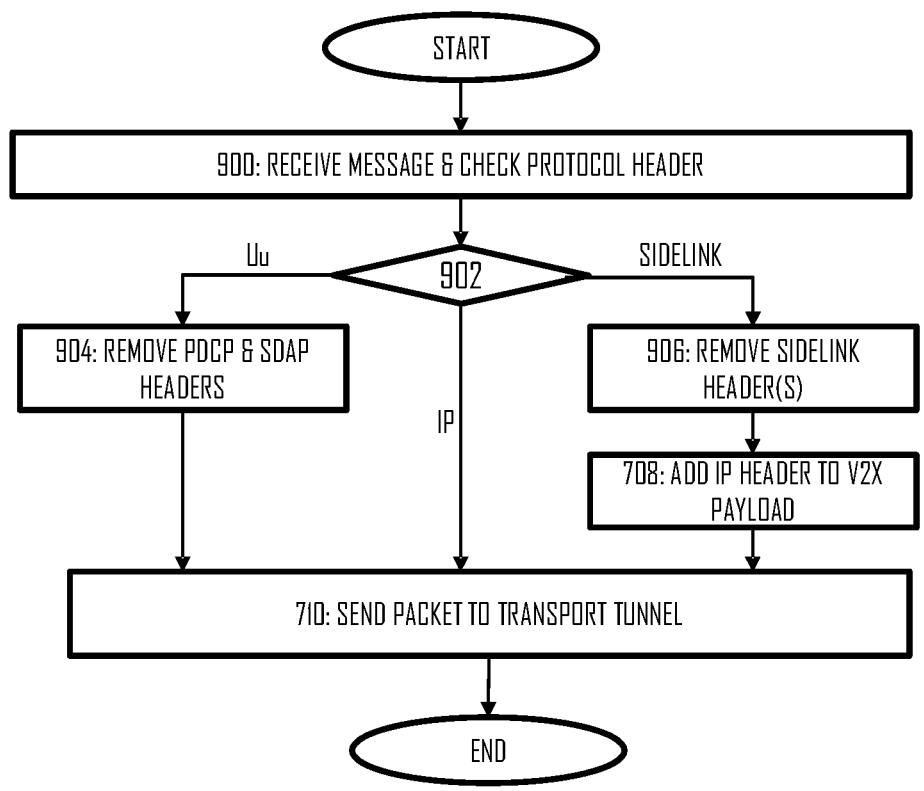
FIG. 9 illustrates a flow diagram of processing messages in an access node according to an embodiment of the invention.

FIG. 9 illustrates a flow diagram of operation of the access node when processing various (uplink) messages. The process of FIG. 9 may be executed by the DU, the CU-UP, or the access node of gNB in general. Referring to FIG. 9, a message is received by a radio modem of the access node (block 900). A protocol header of the message is checked and the message type is identified in block 902. If the message is received through the (Uu) interface for cellular connections, the process may proceed to block 904 where appropriate headers of a cellular frame are removed, including PDCP and SDAP headers. Thereafter, the message may be transmitted to an appropriate GTP tunnel or port in the N3 interface (block 710).

If the message is received through a sidelink radio interface, the process may proceed to block 906 where appropriate headers of a V2X frame are removed. If the sidelink radio interface is the PC5 interface, the removed headers may include the PDCP, SDAP, and PC5 headers. If the sidelink radio interface is the 802.11, the removed headers may include DSRC and TCP/UDP headers. Thereafter, the IP header is added to the extracted V2X payload (block 708) where the destination IP address is the IP address of the application server that may reside beyond the core network. Thereafter, the message may be transmitted to an appropriate GTP tunnel or port in the N3 interface (block 710).

In an embodiment where the DU supports multiple sidelink communication protocol stacks, a separate PDU session and a separate GTP tunnel may be established for each sidelink communication protocol stack, e.g. one for the PC5 radio modem and one for the 802.11p interface. In such a case, the DU may add to each uplink message carrying a V2X payload an identifier of a radio interface over which the V2X payload was received. As a consequence, the CU-UP is able to map the V2X message to the appropriate PDU session or GTP tunnel in the N3 interface.

In an embodiment where the DU supports multiple sidelink communication protocol stacks, the different sidelink communication protocol stacks may be configured to use different functional split between the DU and the CU-UP. For example, the PC5 interface may comply with FIG. 5A while the 802.11 interface complies with the embodiment of FIG. 6B. As another example, a first PC5 interface may comply with FIG. 5A while another PC5 interface complies with the embodiment of FIG. 6A. As yet another example, one DU connected to the CU complies with the embodiment of FIG. 5A while another DU connected to the CU complies with the embodiment of FIG. 5B. In such an embodiment, the DU may add to each uplink message carrying a V2X payload an identifier indicating a radio communication protocol stack with which the V2X message has been processed. Such marking enables co-existence of different types of DUs connected to the same CU.

If the received message is an IP message, e.g. received by the CU-UP from the DU terminating the sidelink, the process may proceed from block 902 directly to block 710.

Figure 10:
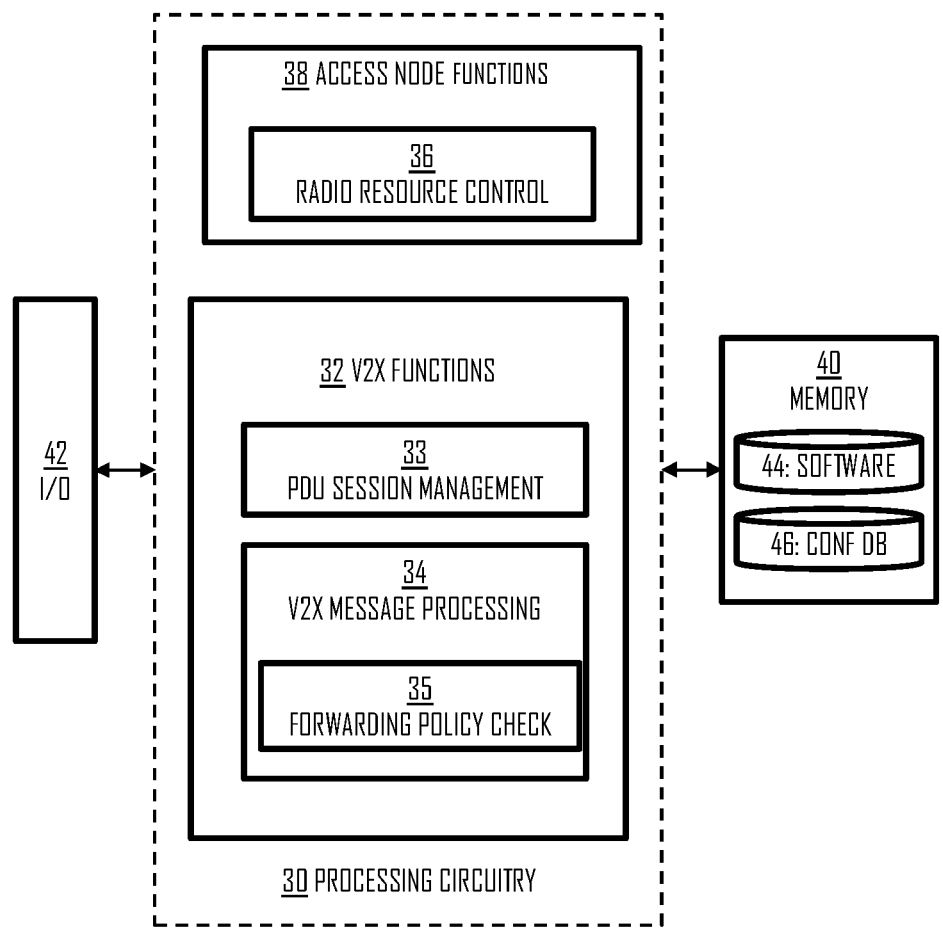
FIG. 10 illustrates a block diagram of an apparatus according to an embodiment.

FIG. 10 illustrates an apparatus comprising at least one processor or a processing circuitry 30, and at least one memory 40 including a computer program code (software) 44, wherein the at least one memory and the computer program code (software) are configured, with the at least one processor, to cause the respective apparatus to carry out any one of the embodiments described above. The apparatus may implement the access node functions and the functions for communicating the V2X messages and V2X payload, as described above. The apparatus may comprise the access node or be comprised or be applicable to the access node. The apparatus of FIG. 10 may be an electronic device.

Referring to FIG. 10, the memory 40 may be implemented using any suitable data storage technology, such as semiconductor based memory devices, flash memory, magnetic memory devices and systems, optical memory devices and systems, fixed memory and removable memory. The memory may comprise a configuration database 46 for storing configuration parameters, e.g. the functional split of the sidelink communication protocol stack for the V2X messages.

The apparatus may further comprise a communication interface 42 comprising hardware and/or software for realizing communication connectivity according to one or more communication protocols. With respect to the functions of the access node, the communication interface 42 may provide the apparatus with a communication capability with terminal devices via a radio interface. Accordingly, the communication interface may support at least some of the functions of the radio interface, e.g. Uu interface. Furthermore, the communication interface 42 may support at least some of the functions of other interfaces over which the access node communicates with other network nodes of the RAN and/or the core network of the cellular communication system, e.g. the UPF and AMF, With respect to the functions of the sidelink communications in the access node, as described above, the communication interface may implement at least some of the above-described protocol layers of the sidelink communication protocol stack. The communication interface may further establish protocol layers for an interface towards the application server, e.g. IP, UDP and GTP-U. The communication interface may thus comprise necessary digital and analog components required to implement such communications.

The processing circuitry 30 may comprise a circuitry 38 managing the access node functions, e.g. establishment and operation of RRC connections with terminal devices server by the access node comprising the apparatus. The circuitry 38 may comprise a RRC circuitry 36 managing the radio resources available to the access node. The RRC circuitry may allocate radio resources only to the access node functions 38 but not to the V2X functions 32, not even in the embodiment where the virtual UE is also configured to carry out V2X transmissions.

The processing circuitry may further comprise a circuitry 32 carrying out the V2X functions, e.g. receiving, processing, and transmitting the messages carrying V2X payload according to the embodiments described above. The circuitry 32 may comprise a PDU session management circuitry 33 configured to carry out the PDU session establishment and management for communicating the V2X messages towards and from the core network. The circuitry 32 may further comprise a V2X message processing circuitry 34 configuring the interface 42 to receive and/or transmit the V2X messages and to process the V2X messages. The circuitry 34 may comprise a forwarding policy check circuitry 35 configured to determine a forwarding policy for a captured message according to the embodiment of block 704, for example. The determination may comprise accessing the configuration database 46 for the IP address of the application server, for example.

In an embodiment, at least some of the functionalities of the apparatus of FIG. 10 are shared between two physically separate devices, e.g. the DU and the CU-UP. Therefore, the apparatus may be seen to depict the operational entity comprising one or more physically separate devices for executing at least some of the processes described with respect to the DU, CU-CP, and CU-UP, for example. The apparatus may generate a virtual network combining hardware and software network resources and network functionality into a single, software-based administrative entity, a virtual network. The virtual network may employ physical resources of the core network, radio access network, application server(s), and/or even the terminal device(s). In other words, some or all computation may be outsourced even to the terminal device(s), if such is considered feasible from the perspective of implementation. Network virtualization may involve platform virtualization, often combined with resource virtualization. Network virtualization may be categorized as external virtual networking which combines many networks, or parts of networks, into a server computer or a host computer. External network virtualization is targeted to optimized network sharing. Another category is internal virtual networking which provides network-like functionality to the software containers on a single system.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 3 to 9 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 3 to 9, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 3 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor; and
   at least one memory including a computer program code, wherein the at least one memory and the computer program code are configured, with the at least one processor, to cause the apparatus to:
   process cellular access messages in an access node of a cellular communication system according to a cellular communication protocol stack and to deliver the cellular access messages between a terminal device and a core network of the cellular communication system;
   process broadcast vehicle-to-vehicle messages in the access node according to a sidelink communication protocol stack of vehicle-to-everything communications and to deliver the vehicle-to-vehicle messages between at least one vehicular terminal device and an application server via the sidelink communication protocol stack,
   operate as an end-device for all sidelink communications with the at least vehicular terminal device below an application layer; and receive a vehicle-to-vehicle message via a physical layer of the sidelink communication protocol stack, to extract all headers of the sidelink communication protocol stack from the received vehicle-to-vehicle message, thus extracting a payload of the received vehicle-to-vehicle message, to add a new header to the payload, and to transmit the payload with the new header to the application server.

2. The apparatus of claim 1, wherein both said cellular communication protocol stack and said sidelink communication protocol stack define a radio interface, and wherein the radio interface defined by the cellular communication protocol stack is different from the radio interface defined by the sidelink communication protocol stack.

3. The apparatus of claim 1, wherein the sidelink communication protocol stack is a first sidelink communication protocol stack, and wherein the at least one memory and the computer program code are configured, with the at least one processor, to cause the apparatus to process further vehicle-to-vehicle messages in the access node according to a second sidelink communication protocol stack and to deliver the further vehicle-to-vehicle messages between said at least one vehicular terminal device and the application server via the second sidelink communication protocol stack.

4. The apparatus of claim 1, wherein the sidelink communication protocol stack is according to IEEE 802.11p specifications or PC5 of 3GPP specifications.

5. The apparatus of claim 1, wherein the apparatus is for a distributed unit of a gNB of 3GPP specifications.

6. The apparatus of claim 1, wherein the at least one memory and the computer program code are configured, with the at least one processor, to cause the apparatus to operate a subset of protocol layers of the sidelink communication protocol stack.

7. An apparatus, comprising:
at least one processor; and
at least one memory including a computer program code, wherein the at least one memory and the computer program code are configured, with the at least one processor, to cause the apparatus to:
process cellular access messages in an access node of a cellular communication system according to a cellular communication protocol stack and to deliver the cellular access messages between a terminal device and a core network of the cellular communication system;
process broadcast vehicle-to-vehicle messages in the access node according to a sidelink communication protocol stack of vehicle-to-everything communications and to deliver the vehicle-to-vehicle messages between at least one vehicular terminal device and an application server via the sidelink communication protocol stack; and
operate a subset of protocol layers of the sidelink communication protocol stack,
wherein the apparatus is for a distributed unit of a gNB of 3GPP specifications, and wherein the subset of protocol layers of the sidelink communication protocol stack comprises a number of lowest protocol layers of the sidelink communication protocol stack, and wherein the at least one memory and the computer program code are configured, with the at least one processor, to cause the apparatus to communicate the vehicle-to-vehicle messages with a central unit of the gNB that operates at least the highest protocol layer of the sidelink communication protocol stack.

8. The apparatus of claim 7, wherein the at least one memory and the computer program code are configured, with the at least one processor, to cause the apparatus to receive a vehicle-to-vehicle message via a physical layer of the sidelink communication protocol stack, to extract headers from the received vehicle-to-vehicle message up to the highest protocol layer of the subset of protocol layers of the sidelink communication protocol stack, thus extracting a payload of the received vehicle-to-vehicle message, and to transmit the payload to a central unit of the gNB through an interface between the distributed unit and the central unit.

9. An apparatus, comprising:
at least one processor; and
at least one memory including a computer program code, wherein the at least one memory and the computer program code are configured, with the at least one processor, to cause the apparatus to:
process cellular access messages in an access node of a cellular communication system according to a cellular communication protocol stack and to deliver the cellular access messages between a terminal device and a core network of the cellular communication system;
process broadcast vehicle-to-vehicle messages in the access node according to a sidelink communication protocol stack of vehicle-to-everything communications and to deliver the vehicle-to-vehicle messages between at least one vehicular terminal device and an application server via the sidelink communication protocol stack; and
operate a subset of protocol layers of the sidelink communication protocol stack,
wherein the apparatus is for a central unit of a gNB of 3GPP specifications, and wherein the subset of protocol layers of the sidelink communication protocol stack comprises a number of highest protocol layers of the sidelink communication protocol stack, and wherein the at least one memory and the computer program code are configured, with the at least one processor, to cause the apparatus to communicate the vehicle-to-everything messages with a distributed unit of the gNB that operates at least the lowest protocol layer of the sidelink communication protocol stack.

10. The apparatus of claim 9, wherein the at least one memory and the computer program code are configured, with the at least one processor, to cause the apparatus to receive a payload of a vehicle-to-vehicle message from a distributed unit of the gNB on the lowest layer of the sidelink communication protocol stack supported by the central unit, to extract remaining headers from the received vehicle-to-vehicle message up to the highest protocol layer of the subset of protocol layers of the sidelink communication protocol stack, thus extracting a payload of the received vehicle-to-vehicle message, to add a new header to the payload, and to transmit the payload with the new header to the application server.

11. A method, comprising:
processing, by an access node of a cellular communication system, cellular access messages according to a cellular communication protocol stack and delivering, by the access node, the cellular access messages between a terminal device and a core network of the cellular communication system;
processing, by the access node, broadcast vehicle-to-vehicle messages according to a sidelink communication protocol stack of vehicle-to-everything communications and delivering, by the access node, the vehicle-to-vehicle messages between at least one vehicular terminal device and an application server via the sidelink communication protocol stack;

operating as an end-device for all sidelink communications with the at least vehicular terminal device below an application layer; and receiving a vehicle-to-vehicle message via a physical layer of the sidelink communication protocol stack, to extract all headers of the sidelink communication protocol stack from the received vehicle-to-vehicle message, thus extracting a payload of the received vehicle-to-vehicle message, to add a new header to the payload, and to transmit the payload with the new header to the application server.

12. A computer-program product comprising a computer program code embodied on a non-transitory distribution medium readable by a computer, wherein the computer program code configures the computer, when executed by the computer, to carry out a computer process comprising:

processing, in an access node of a cellular communication system, cellular access messages according to a cellular communication protocol stack and delivering the cellular access messages between a terminal device and a core network of the cellular communication system; and processing, in the access node, broadcast vehicle-to-vehicle messages according to a sidelink communication protocol stack of vehicle-to-everything communications and delivering the vehicle-to-vehicle messages between at least one vehicular terminal device and an application server via the sidelink communication protocol stack;

operating as an end-device for all sidelink communications with the at least vehicular terminal device below an application layer; and receiving a vehicle-to-vehicle message via a physical layer of the sidelink communication protocol stack, to extract all headers of the sidelink communication protocol stack from the received vehicle-to-vehicle message, thus extracting a payload of the received vehicle-to-vehicle message, to add a new header to the payload, and to transmit the payload with the new header to the application server.

* * * * *